United States Patent [19]

Jacoby et al.

[11] Patent Number: 4,825,075
[45] Date of Patent: Apr. 25, 1989

[54] NON-ELECTRONIC GAIN CONTROL

[75] Inventors: Elliot Jacoby, Glenside; Stephen J. Yuhasz, Zionsville; Noel Mayo, Philadelphia, all of Pa.

[73] Assignee: Lutron Electronics Co., Inc., Coopersburg, Pa.

[21] Appl. No.: 79,848

[22] Filed: Jul. 30, 1987

[51] Int. Cl.⁴ .............................................. G02F 1/01
[52] U.S. Cl. ................................. 250/342; 250/216; 350/354
[58] Field of Search ............... 250/216, 221, 342, 353; 350/354

[56] References Cited

U.S. PATENT DOCUMENTS

| | | | |
|---|---|---|---|
| 4,314,743 | 2/1982 | Rast | 350/354 |
| 4,514,630 | 4/1985 | Takahashi | 250/342 |
| 4,514,631 | 4/1985 | Guscott | 250/342 |
| 4,546,248 | 10/1985 | Craig | 350/354 X |

FOREIGN PATENT DOCUMENTS 0209387  9/1986  Japan .................................. 250/338

Primary Examiner—Eugene R. LaRoche
Assistant Examiner—Robert J. Pascal
Attorney, Agent, or Firm—James Riesenfeld

[57] ABSTRACT

A receiver for a radiated electromagnetic signal includes elements that respectively transmit a high percentage and a low percentage of the incident signal, in combination with a detector. The device is adapted for mounting on or near a horizontal surface, such as a ceiling. The signal is preferably in the infrared region of the spectrum. The receiver provides non-electronic gain control and, when the high-transmission element passes the signal wavelength preferentially over other wavelengths, it also provides improved noise immunity.

10 Claims, 2 Drawing Sheets

NON-ELECTRONIC GAIN CONTROL

BACKGROUND OF THE INVENTION

1. Field of the Invention

This invention relates to a receiver that has a non-electronic gain control and, more particularly, a receiver that comprises a combination of elements that pass, attenuate, and detect a radiated electromagnetic signal.

2. Description of the Related Art

A conventional communications system generally includes, among other elements, a transmitter, receiver, and amplifier. If the transmitted signal is encoded, the amplifier output goes to a decoder, and, ideally, that output should be constant. Thus if the signal to the receiver becomes weaker, the amplifier gain must be correspondingly increased. Electronic circuits to provide automatic gain control are well known; however, tradeoffs are necessary among parameters such as bandwidth, cost, sensitivity, etc.

Systems operated by radiated signals are known for many remote control operations, including garage door openers, TV controls, etc. To the extent necessary, these systems rely on electronic gain control to provide the required dynamic range.

Ceiling-mountable infrared detectors have been disclosed for use in intrusion detection systems. Takahashi (U.S. Pat. No. 4,514,630) and Guscott (U.S. Pat. No. 4,514,631) have disclosed infrared detectors that use mirrors to define a field of view.

SUMMARY OF THE INVENTION

In accordance with the present invention, a device for receiving a radiated electromagnetic signal arriving at a substantially horizontal first surface comprises:

(a) signal detector means, adapted for mounting in a fixed relationship to said first surface, (b) a low-transmission element, adapted for mounting in spaced-apart relationship to said first surface, having a second surface, and comprising a material that transmits no more than 50% of signal arriving at normal incidence to said second surface, and (c) a high-transmission element, surrounding said signal detector means in a horizontal plane, and extending substantially vertically between said first surface and said low-transmission element.

When mounted on a horizontal surface, the device attenuates signals that arrive at small angles to the vertical (which corresponds, generally, to small distances from the detector), while permitting signals that arrive at large angles (i.e., more distant signals) to reach the detector without appreciable attenuation by the device. Thus, the device acts as a non-electronic gain control, and one can achieve greater sensitivity to weak signals, without risking saturation at high signal levels. Gain can be increased, so that weak distant signals can be amplified to a greater degree; strong signals are attenuated by the device, so that there is no saturation. Similarly, if the high transmission element selectively passes the signal wavelength, compared to other wavelengths, greater noise immunity can be achieved, as well.

DETAILED DESCRIPTION OF THE INVENTION

A wireless communications system provides a convenient method for remote control. For some time, such systems have been widely used in controlling garage doors, model airplanes, cars, and boats, and for many military applications. The systems are commonly used to control TV sets, as well. In these applications, the wireless control system generally includes a portable transmitter, a receiver, and a controller that controls a load in accordance with the signal received by the receiver. If operation is to be possible over a wide range of distances, then the system must be operable with a wide range of intensity input to the receiver.

Figure 1:
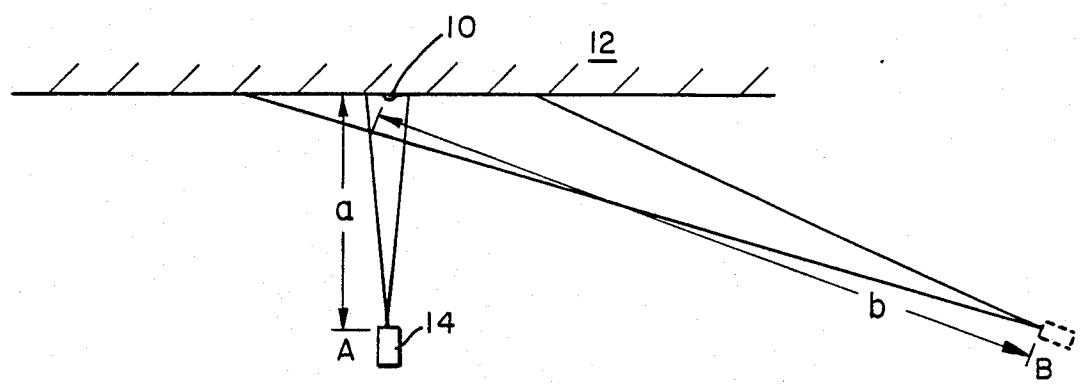
FIG. 1 is a schematic of a prior art system.

A system in which a receiver is mounted on a horizontal surface is illustrated schematically in FIG. 1, where receiver 10 is mounted in ceiling 12 Maximum intensity is incident on receiver 10 when the transmitter 14 is at position A, directly beneath the receiver. When the transmitter is at position B, and assuming it to be a point source, the intensity is related to the earlier intensity as follows:

$$I_B/I_A = a^2/b^2$$

The intensities incident on the receiver vary inversely as the square of the distances from the transmitter. The greater the ratio of maximum to minimum distances over which control must be possible, the greater must be the dynamic range of the receiver and its associated circuitry.

To reduce the dynamic range required of the receiver and its associated circuitry, the present invention provides "non-electronic" gain control. The gain control includes a low-transmission element, which reduces the signal to the radiation detector when signals are incident at near-normal incidence. This element is not in the path of radiation that arrives at the detector at large angles to the normal (i.e., from far away).

Figure 2:
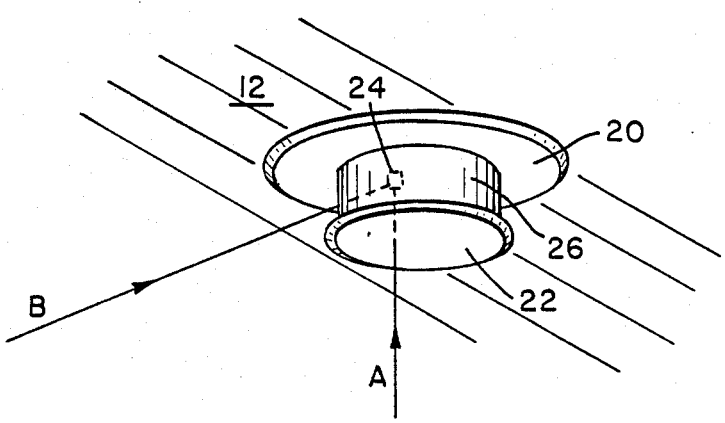
FIG. 2 depicts the gain control device of the present invention.

FIG. 2 depicts an embodiment of the present invention. Optional support 20 is mounted on ceiling 12. Ray A represents a high-intensity signal, which arrives from directly below the receiver and impinges on low-transmission element 22, before passing to detector 24. Less than half the incident intensity is transmitted by element 22. A high transmission element, or window, 26, is in the path of ray which arrives from a distant source, accordingly with a lower intensity. Window 26 causes little attenuation of ray as it passes to detector 24. Thus, the receiver reduces the range of intensities that are incident on the detector. Consequently, the gain of the amplifier can be increased, to pick up weak incident signals, without risking saturation with strong incident signals. FIG. 2 shows a preferred embodiment of the device, in which the low-transmission element is a substantially circular disk, parallel to the ceiling, and the high transmission element is a substantially cylindrical tube that extends between the support and the low-transmission element The disk diameter, as shown, is preferably greater than the outer tube diameter. In a preferred embodiment, high-transmission element 26, while passing substantially the entire intensity of the signal, selectively attenuates radiation at wavelengths other than that of the signal, thereby providing improved noise immunity.

The permissible wavelength range for the electromagnetic signal extends through much of the spectrum, including visible, infrared, microwave, and radio frequencies; however, infrared is preferred, because the background radiation in that range can be reduced to low levels and the radiation is readily detected. Sensitive infrared detectors are well known in the art and include thermistor, pyroelectric, photovoltaic, phototransistor, photodiode, and photoconductive devices. Photodiodes are preferred, because they are sensitive, have quick response, are easy-to-use, and are readily available. They provide excellent signal/noise ratio. The device can operate with a single detector; however, if signals are to be incident from different directions and/or the detector response depends on the angle of incidence, then multiple detectors are preferred.

As depicted in FIG. 2, the low-transmission element is a sheet mounted parallel to the horizontal surface. This is the preferred configuration, because it is easily achieved; however, as will be clear to those skilled in the art, other configurations are also feasible, provided that they ensure that incident radiation that makes a small angle with a normal to the horizontal surface preferentially passes through this element, compared With radiation that makes a large angle with the normal. Any material that transmits no more than about 50% of the radiation arriving at normal incidence to its surface is suitable for the low-transmission element. When the signal is an r.f. signal, a grounded conductor may serve. When the signal is infrared, plastics are preferred, because they are readily available in suitable form and with suitable optical properties.

The high-transmission element surrounds the detector in a horizontal plane, preferably as a substantially cylindrical hollow tube, having one circular face adjoining the horizontal surface and the opposite circular face adjoining the low-transmission element.

Many materials are suitable for use in the high-transmission element, since the primary requirement is that the element be substantially transparent to the signal. Many transparent glass and plastic materials are available for use when the signal is in the infrared or visible region. In addition, filters are well known for selectively absorbing different regions of the spectrum. For example, red polycarbonate is a preferred material for use with infrared signals, since it absorbs most of the visible light incident upon it, while passing the infrared light.

Although construction of this device is simpler when the low-and high-transmission elements are separate, a single element of variable optical density would be suitable, provided that rays incident normal to the horizontal surface pass through a region of higher optical density than do rays incident at large angles to the normal.

In addition to the location and geometry of the receiver device and transmitter and the optical properties of the receiver, reflections from a variety of surfaces can affect the intensity of the signal that reaches the detector. Among these surfaces are the horizontal surfaces on which the receiver is mounted, the surfaces of the high- and low-transmission elements, and other surfaces that are part of the device or in its vicinity. Depending on the nature and positioning of these surfaces, reflections can provide a substantial part of the detected signal. Thus, for use with an infrared signal, ABS (acrylonitrile-butadiene-styrene copolymer) is a preferred material for the low-transmission element, even though it is substantially opaque to infrared radiation.

The following example is presented in order to provide a more complete understanding of the invention. The specific techniques, conditions, materials, and reported data set forth to illustrate the principles and practice of the invention are exemplary and should not be construed as limiting the scope of the invention.

EXAMPLE

Figure 3:
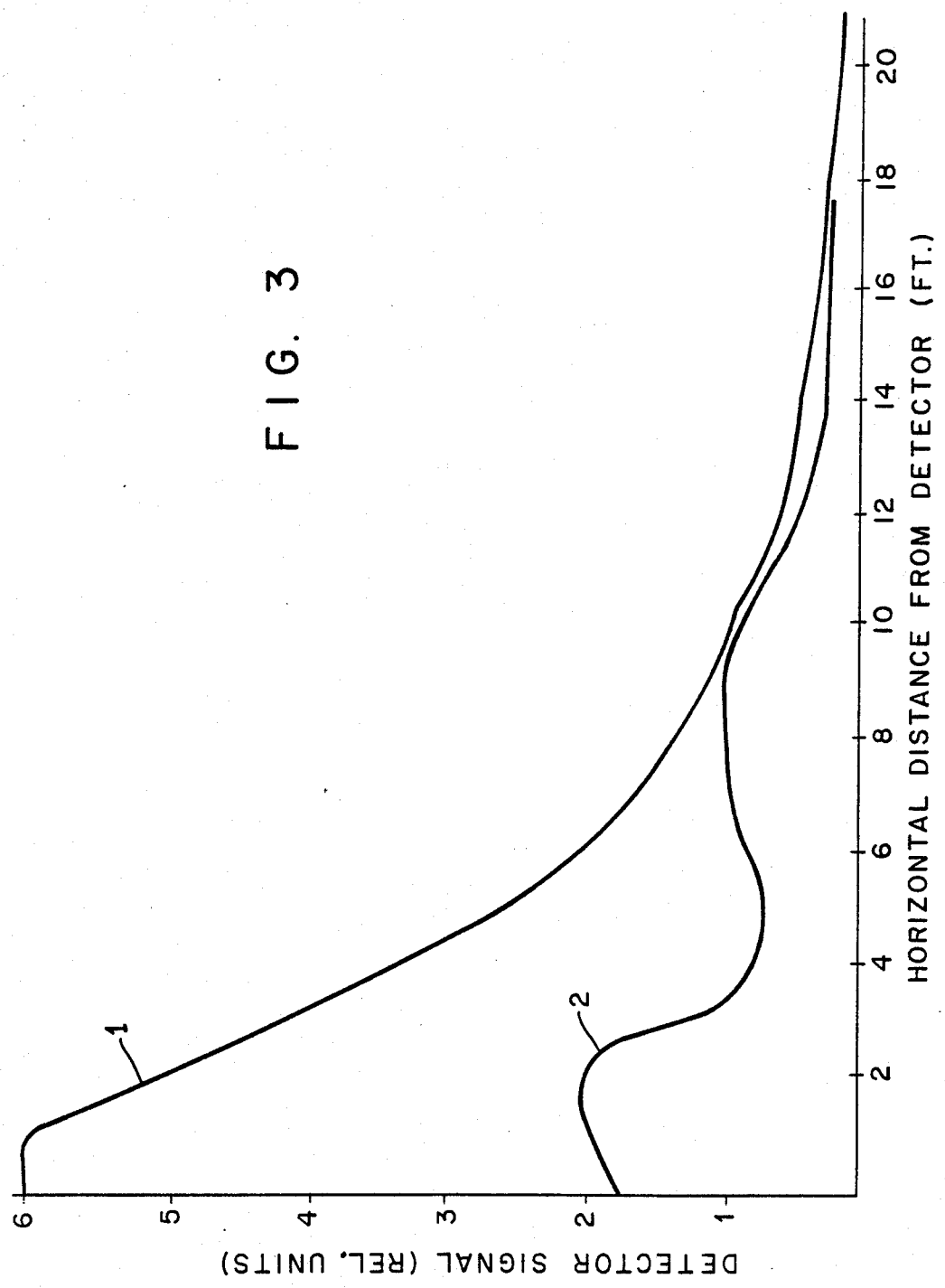
FIG. 3 is a graph that shows results achieved with the device of FIG. 2.

The receiver device depicted in FIG. 2 was tested and compared with a device that incorporated no low-transmission element. Details of the actual device appear in the table below. The effect of the receiver on near and distant signal intensities is shown in FIG. 3. Data for curve 1 were generated with an infrared signal from a wireless transmitter directed at a ceiling-mounted photodiode detector surrounded by a high-transmission element. The plot shows the detector voltage as a function of the horizontal distance from a point directly (about five feet) below the detector. Curve 2 shows the results obtained using the receiver of FIG. 2. Comparison of curves 1 and 2 shows that the receiver of the present invention reduced the maximum detector voltage b a factor of 3, while leaving the minimum voltage substantially unchanged. Thus, the electronics need only deal with a much smaller dynamic range, and, as a result, higher gain, greater noise suppression, and similar goals can be achieved.

TABLE

Detector—3 PIN Photodiodes, Siemens SFH 205
High-Transmission Element—red polycarbonate, 0.030" thick
Low-Transmission Element—ABS disk, 3/32" thick
Sinal—4 LED's, Siemens SFH 484
Detector located ~5 ft. above transmitter.

The present invention having been described in connection with preferred embodiments, many variations and modifications will now become apparent to those skilled in the art. Therefore, the present invention is to be limited not by the specific disclosure, but only by the appended claims.

We claim:

1. A device for receiving a radiated electromagnetic signal arriving at a substantially horizontal first surface; said device comprising:
   (a) signal detector means, adapted for mounting in a fixed relationship to said first surface,
   (b) a low transmission element, adapted for mounting in spaced-apart relationship to said first surface, having a second surface, and comprising a material that transmits no more than 50% of signal arriving at normal incidence to said second surface, and
   (c) a high-transmission element, surrounding said signal detector means in a horizontal plane and extending substantially vertically between said first surface and said low-transmission element.

2. The device of claim 1, in which said signal comprises an infrared signal of a predetermined wavelength.

3. The device of claim 2, in which said signal detector means comprises a photodiode.

4. The device of claim 1, in which said low-transmission element comprises a substantially planar sheet adapted for mounting substantially parallel to said first surface.

5. The device of claim 2, in which said low-transmission element comprises a thermoplastic material.

6. The device of claim 5, in which said thermoplastic comprises acrylonitrile-butadiene-styrene copolymer.

7. The device of claim 2, in which said high-transmission element transmits substantially less radiation at shorter wavelengths than it does at the signal wavelength.

8. The device of claim 2, in which said high-transmission element transmits substantially less radiation at shorter and longer wavelengths than it does at the signal wavelength.

9. The device of claim 4, in which said high-transmission element comprises a substantially cylindrical hollow tube, having a first circular face adjacent to said first surface and a second circular face adjoining said planar sheet.

10. The device of claim 9, in which said sheet comprises a substantially circular disk, having a diameter that is greater than the outer diameter of the hollow tube.

* * * * *